US010517088B2

(12) United States Patent
Tang et al.

(10) Patent No.: US 10,517,088 B2
(45) Date of Patent: Dec. 24, 2019

(54) METHOD OF INDICATING MACHINE TYPE COMMUNICATION (MTC) BY A TERMINAL TO A BASE-STATION IN A WIRELESS COMMUNICATION SYSTEM

(71) Applicant: GUANGDONG OPPO MOBILE TELECOMMUNICATIONS CORP., LTD., Dongguan, Guangdong (CN)

(72) Inventors: Hai Tang, Dongguan (CN); Yuanqing Zeng, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 15/573,330

(22) PCT Filed: Apr. 27, 2016

(86) PCT No.: PCT/CN2016/080337
§ 371 (c)(1),
(2) Date: Nov. 10, 2017

(87) PCT Pub. No.: WO2016/192490
PCT Pub. Date: Dec. 8, 2016

(65) Prior Publication Data
US 2018/0092079 A1  Mar. 29, 2018

(30) Foreign Application Priority Data
May 29, 2015  (CN) .......................... 2015 1 0292277

(51) Int. Cl.
*H04W 72/04* (2009.01)
*H04W 4/70* (2018.01)
(Continued)

(52) U.S. Cl.
CPC ........... *H04W 72/044* (2013.01); *H04W 4/08* (2013.01); *H04W 4/70* (2018.02); *H04W 72/04* (2013.01);
(Continued)

(58) Field of Classification Search
CPC ..... H04W 72/044; H04W 4/08; H04W 76/10; H04W 4/70; H04W 72/04; H04W 88/08; H04W 52/0261; Y02D 70/20
See application file for complete search history.

(56) References Cited

U.S. PATENT DOCUMENTS

2008/0008111 A1*  1/2008  Prakash ............ H04L 29/12028
                                                              370/310
2012/0004003 A1   1/2012  Shaheen
(Continued)

FOREIGN PATENT DOCUMENTS

CN       102668493 A      9/2012
CN       102804882 A      11/2012
(Continued)

OTHER PUBLICATIONS

International Search Report (ISR) and Written Opinion dated Jul. 15, 2016 for International Application No. PCT/CN2016/080337.
(Continued)

*Primary Examiner* — Ian N Moore
*Assistant Examiner* — Rushil Parimal Sampat

(57) ABSTRACT

An MTC method includes: a base station receives a terminal identity and business registration information from a terminal, the business registration information including a business type and service subscription information; the base station allocates time-frequency reporting resource information to the terminal according to the business registration information; the base station sends the time-frequency reporting resource information to the terminal; and the base
(Continued)

station receives an uplink data packet from the terminal according to the time-frequency reporting resource information. In the embodiment, the base station allocates the time-frequency reporting resource information to the terminal to ensure that the terminal sends the uplink data packet to the base station. Such a scheduling process is simple and consistent, which can reduce complexity and power consumption of MTC, and can further reduce deployment cost of an MTC system and prolong the service life of battery-powered equipment.

18 Claims, 4 Drawing Sheets

(51) Int. Cl.
  *H04W 76/10* (2018.01)
  *H04W 4/08* (2009.01)
  *H04W 52/02* (2009.01)
  *H04W 88/08* (2009.01)

(52) U.S. Cl.
  CPC ........ *H04W 76/10* (2018.02); *H04W 52/0261* (2013.01); *H04W 88/08* (2013.01); *Y02D 70/1262* (2018.01); *Y02D 70/164* (2018.01); *Y02D 70/20* (2018.01); *Y02D 70/21* (2018.01); *Y02D 70/26* (2018.01)

(56) References Cited

U.S. PATENT DOCUMENTS

| | | | |
|---|---|---|---|
| 2012/0155406 | A1 | 6/2012 | Kim et al. |
| 2012/0163311 | A1 | 6/2012 | Park |
| 2012/0163313 | A1 | 6/2012 | Jung |
| 2012/0252481 | A1* | 10/2012 | Anpat ............... H04W 8/06 455/456.1 |
| 2013/0077583 | A1 | 3/2013 | Kim |
| 2013/0137432 | A1* | 5/2013 | Wong ............... H04W 36/00 455/436 |
| 2014/0010212 | A1 | 1/2014 | McNamara |
| 2014/0036878 | A1 | 2/2014 | McNamara |
| 2015/0023244 | A1 | 1/2015 | Shaheen et al. |
| 2015/0078231 | A1 | 3/2015 | Bergström |
| 2015/0223028 | A1 | 8/2015 | Wang et al. |
| 2015/0237651 | A1 | 8/2015 | Nobusawa et al. |
| 2015/0282145 | A1* | 10/2015 | Kim ............... H04W 72/0406 455/450 |
| 2016/0234699 | A1 | 8/2016 | Iwai et al. |
| 2017/0078931 | A1* | 3/2017 | Yoshizawa ........ H04W 36/0083 |
| 2018/0115879 | A1* | 4/2018 | Lindqvist .......... H04W 52/0229 |

FOREIGN PATENT DOCUMENTS

| | | |
|---|---|---|
| CN | 103209384 A | 7/2013 |
| CN | 103813261 A | 5/2014 |
| CN | 103828469 A | 5/2014 |
| CN | 103999524 A | 8/2014 |
| CN | 104221457 A | 12/2014 |
| CN | 104936133 A | 9/2015 |
| WO | 2013024435 A1 | 2/2013 |
| WO | 2013154475 A1 | 10/2013 |
| WO | 2014061537 A1 | 4/2014 |
| WO | 2014053084 A1 | 4/2014 |
| WO | 2015045223 A1 | 4/2015 |

OTHER PUBLICATIONS

Espacenet English abstract of CN 104936133 A.
Espacenet English abstract of WO 2014/061537 A1.
Supplementary European Search Report in European application No. 16802413.1, dated Sep. 27, 2018.

* cited by examiner

METHOD OF INDICATING MACHINE TYPE COMMUNICATION (MTC) BY A TERMINAL TO A BASE-STATION IN A WIRELESS COMMUNICATION SYSTEM

The present disclosure claims benefit of Chinese Application No. 201510292277.0, filed on May 29, 2015 and named after "Machine Type Communication (MTC) method, base station and terminal", the contents of which are hereby incorporated by reference in its entirety.

TECHNICAL FIELD

Embodiments of the present disclosure relate to the field of communications, and in particular to an MTC method, a base station and a terminal.

BACKGROUND

A conventional mobile communication network is mainly for human-to-human voice communication. The introduction of MTC may cause relatively great influence on the conventional mobile communication network. Therefore, besides supporting conventional voice data communication with human service objects, a next-generation mobile communication network (which may be called as 5th-Generation (5G)) further includes MTC applications in various scenarios, such as various kinds of intelligent monitoring of industry, agriculture, intelligent transportation, smart home, intelligent meter reading, earthquake, tsunami and fire monitoring and the like.

MTC is applied on a large scale to application scenarios quite different from a conventional mobile communication system, so that a series of new requirements on a wireless communication technology are made. For example, monitoring sensor type equipment which is deployed on a large scale and mostly powered by batteries has the characteristics of low cost, low power consumption, long-period small data packet transmission, delay insensitivity and the like. While a machine applied to industrial production, the Internet of vehicles, intelligent transportation and the like requires an extremely short delay, high reliability and high availability to ensure normal running. These new characteristics require a 5G system to adopt a series of new technologies.

An existing machine communication terminal which transmits data by virtue of a wireless technology may usually use a dedicated technology or a mature 2nd/3rd/4th-Generation (2/3/4G) communication module. It is difficult for a module using a dedicated technology to gain scale benefits.

Part of technologies try to make improvements on the basis of a 4G mobile communication technology. For example, machine communication devices are grouped for resource sharing. However, these technical solutions still have shortcomings, such as complex flow, reduction in system deployment flexibility, high battery life reduction rate caused by increase of power consumption of part of terminals and relatively more occupied Internet Protocol (IP) and wireless system resources.

It can be seen that large-scale MTC cannot be realized by a 2/3/4G mobile communication technology in terms of complexity, power consumption and the like because large-scale MTC is not considered in the early stage of designing.

SUMMARY

Embodiments of the present disclosure provide an MTC method, a base station and a terminal, which may reduce complexity and power consumption of MTC.

According to a first aspect of the present disclosure, there is provided a method for MTC, which may include:

receiving, by a base station, a terminal identity and business registration information from a terminal, the business registration information comprising a business type and service subscription information;

allocating, by the base station, time-frequency reporting resource information to the terminal according to the business registration information;

sending, by the base station, the time-frequency reporting resource information to the terminal; and receiving, by the base station, an uplink data packet from the terminal according to the time-frequency reporting resource information.

According to a second aspect of the present disclosure, there is provided a method for MTC, which may include:

sending, by a terminal, a terminal identity and business registration information to a base station, the business registration information comprising a business type and service subscription information of the terminal;

receiving, by the terminal, time-frequency reporting resource information allocated to the terminal by the base station according to the business registration information; and sending, by the terminal, an uplink data packet to the base station according to the time-frequency reporting resource information.

According to a third aspect of the present disclosure, there is provided a base station, which may include:

a receiving unit, arranged to receive a terminal identity and business registration information from a terminal, the business registration information including a business type and service subscription information;

an allocation unit, arranged to allocate time-frequency reporting resource information to the terminal according to the business registration information received by the receiving unit;

a sending unit, arranged to send the time-frequency reporting resource information allocated by the allocation unit to the terminal; and the receiving unit is further arranged to receive an uplink data packet from the terminal according to the time-frequency reporting resource information.

According to a fourth aspect of the present disclosure, there is provided a terminal, which may include:

a sending unit, arranged to send a terminal identity and business registration information to a base station, the business registration information including a business type and service subscription information;

a receiving unit, arranged to receive time-frequency reporting resource information allocated to the terminal by the base station according to the business registration information sent by the sending unit; and the sending unit is further arranged to send an uplink data packet to the base station according to the time-frequency reporting resource information.

According to a fifth aspect of the present disclosure, there is provided a base station, which may include:

a receiver, arranged to receive a terminal identity and business registration information from a terminal, the business registration information including a business type and service subscription information;

a processor, arranged to allocate time-frequency reporting resource information to the terminal according to the business registration information received by the receiver;

a sender, arranged to send the time-frequency reporting resource information allocated by the processor to the terminal; and the receiver is further arranged to receive an uplink data packet from the terminal according to the time-frequency reporting resource information.

According to a sixth aspect of the present disclosure, there is provided a terminal, which may include:

a sender, arranged to send a terminal identity and business registration information to a base station, the business registration information including a business type and service subscription information;

a receiver, arranged to receive time-frequency reporting resource information allocated to the terminal by the base station according to the business registration information sent by the sender; and the sender is further arranged to send an uplink data packet to the base station according to the time-frequency reporting resource information.

In the embodiments of the present disclosure, the base station allocates time-frequency reporting resource information to the terminal to ensure that the terminal sends an uplink data packet to the base station. Such a scheduling process is simple and consistent, which may reduce complexity and power consumption of MTC, further reduce the deployment cost of an MTC system and prolong the service life of battery-powered equipment.

BRIEF DESCRIPTION OF DRAWINGS

In order to describe the technical solutions in the embodiments of the present disclosure more clearly, the drawings used for descriptions about the embodiments or related art will be simply introduced below. Obviously, the drawings described below are only some embodiments of the present disclosure. Those skilled in the art may further obtain other drawings according to these drawings without creative work.

DETAILED DESCRIPTION

The technical solutions in the embodiments of the present disclosure will be clearly and completely described below with reference to the drawings in the embodiments of the present disclosure. Obviously, the described embodiments are not all embodiments but part of embodiments of the present disclosure. All other embodiments obtained on the basis of the embodiments in the present disclosure by those skilled in the art without creative work shall fall within the scope of protection of the present disclosure.

It is to be noted that MTC in the embodiments of the present disclosure may also be called as Machine to Machine (M2M) communication. However, it will also be appreciated that MTC not only includes inter-machine communication, but also includes human-computer interaction communication.

It is to be noted that a base station in the embodiments of the present disclosure may be any equipment with a base station function. For example, the base station may be a NodeB in a 3G mobile communication system, an Evolutional Node B (eNB or eNodeB) in Long Term Evolution (LTE) of a 4G mobile communication system, or a node with the base station function in future 5G, which will not be limited in the present

DISCLOSURE

It is to be noted that a terminal in the embodiments of the present disclosure refers to an MTC terminal, which may also be called as an MTC device. For example, the MTC terminal may be a smart phone, an intelligent electric meter, or intelligent wearable equipment, which will not be limited in the present disclosure.

Figure 1:
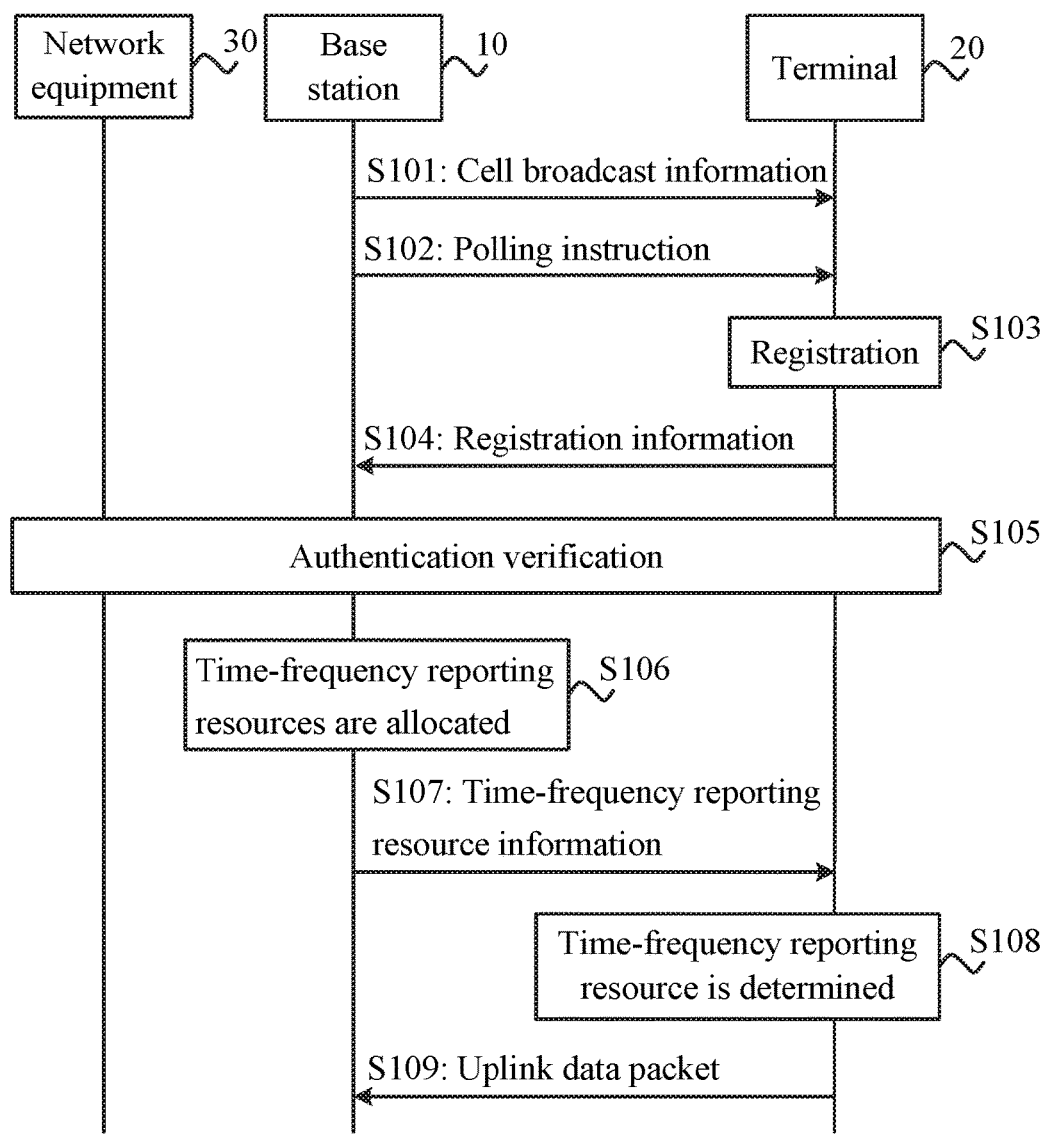
FIG. 1 is a flowchart of an MTC method according to an embodiment of the present disclosure.

FIG. 1 is a flowchart of an MTC method according to an embodiment of the present disclosure. In FIG. 1, a base station 10, a terminal 20 and network equipment 30 are shown, wherein the network equipment 30 may be any one of: a wireless access network, a subscriber identity data server (such as a subscriber Home Location Register (HLR)), an authentication server and an MTC service subscription server. The method shown in FIG. 1 includes the following processes.

In S101, the base station 10 sends cell broadcast information through broadcast.

Specifically, the base station 10 may periodically broadcast the cell broadcast information. Specifically, the cell broadcast information may include a basic parameter of a cell. The basic parameter of the cell may include at least one of: a cell Identification (ID), a cell frequency point, a cell frequency bandwidth, an antenna number (the number of antennas), a cell transmission environment type, a cell resource utilization rate, transmitted power of the base station, and a System Frame Number (SFN) at a broadcast time of the cell broadcast information.

Here, the cell transmission environment type may be one of: indoor, dense urban, urban, sub-urban and rural.

Here, system frames may have same or different time lengths. For example, under the condition that the system frames have different time lengths, system information in an (R−i)th (i=1, 2, . . . , R−1) system frame may be used to indicate a length of an Rth system frame. Moreover, the information may be broadcast for one to i−1 times in system frames numbered from R−i to R−1 to ensure reliable reception of the terminal.

Optionally, the cell broadcast information may also include multiple weights (which may also be called as weighted coefficients). The multiple weights correspond to multiple judgment bases one to one, and the judgment bases are the grounds for the terminal 20 to judge whether to initiate registration or not. Here, the multiple weights may be determined by the base station 10 according to an MTC service characteristic, system resource utilization and other factors. Specifically, Please refer to related descriptions in subsequent S103 for the weights and judgment of the terminal 20 about whether to initiate registration or not.

Moreover, the cell broadcast information may be broadcast and sent by the base station 10 on a dedicated frequency where no data is carried by adopting transmitted power not lower than preset transmitted power. Here, the dedicated frequency may be a relatively lower frequency band where no data is carried, for example, lower than a lowest frequency used for an existing 2/3/4G system Here, the preset transmitted power may be maximum transmitted power used for a macro base station in the existing 2/3/4G system In such a manner, deep coverage (an indoor scenario may be included) may be implemented, cell (with relatively smaller coverage) radio resources actually bearing data businesses may be saved, and moreover, multiple cells can be coordinated directly.

Here, the cell broadcast information may also be sent by a macro base station or a central/regional system scheduler and the like within a relatively larger region including multiple communication base stations, which will not be limited in the present disclosure.

Or, it may be appreciated that the cell broadcast information may also be sent by the base station 10 by adopting preset transmitted power on a frequency which is preset by an operating company. For example, the preset frequency is 150 MHz, and the preset transmitted power is 25 W. There are no limits made in the present disclosure.

In such a manner, a terminal located in a cell where the base station 10 is located can receive the cell broadcast information. Even a terminal located outside the cell where the base station 10 is located can also receive the cell broadcast information. Specifically, the terminal 20 searches for cell broadcast information after being started, and moreover, the terminal 20 may receive cell broadcast information from multiple base stations respectively. Furthermore, the terminal 20 may correctly receive a subsequent message according to the received cell broadcast information.

In addition, the cell broadcast information may include a sending location of a polling instruction, so that the terminal 20 may subsequently receive the polling instruction at the sending location.

In S102, the base station sends a polling instruction.

Specifically, the base station may periodically or non-periodically send the polling instruction through broadcast.

Moreover, the polling instruction may be determined by the base station 10 according to factors such as cell resource utilization, a service requirement of MTC and the like, wherein the cell resource utilization may include a cell load, utilization of a cell access resource and the like.

It is appreciated that the terminal 20 receives the polling instruction at the sending location in S102 if the cell broadcast information in S101 includes the sending location of the polling instruction.

Here, the polling instruction may indicate multiple access resources for an unregistered terminal to use. Here, the access resources, which may also be called as time-frequency registration resources or registration windows, refer to registration windows which are allocated by the base station 10 and may be used for the unregistered terminal. It is appreciated that locations of the registration windows are locations of the access resources.

Specific locations of the registration windows and the number and types of the radio resources usable for registration of the terminal in the registration windows are indicated by the polling instruction. The access resources may also be called as slots, and the base station 10 may allocate slots with different sizes according to a distance between the terminal and the base station, a wireless signal transmission path loss and the like. The sizes of the slots may be regulated in terms of time and/or frequency.

Each access resource in the multiple access resources may include location information and serial number information. Specifically, the base station 10 may number the access resources according to types. For example, relatively larger ones are called as long access resources (which may also be called as long slots), and normal access resources are called as normal access resources (which may also be called as normal slots). That is, the multiple access resources include multiple long access resources and multiple normal access resources. Moreover, the access resources indicated by the polling instruction may be numbered in the following manner: long slot: 1 ... L, and normal slot: 1 ... N, wherein L represents the number of the long access resources, and N represents the number of the normal access resources.

In addition, the location information and serial number information of the access resources may have a corresponding relationship. For example, locations and numbers are associated in a certain manner. For example, they are adjacent or spaced on frequency at the same time point; or they are continuous or spaced on time on the same frequency; or they are two-dimensionally distributed on time/frequency in, for example, a staggered manner. Therefore, time-domain and frequency-domain information may be determined according to the location information and the serial number information.

Furthermore, the polling instruction may also indicate the number of and the utilization of access resources during last polling. The utilization of resources may be one of FULL use, HIGH use, MEDIUM use and LOW use, or may also be a percentage of used resources or a percentage of left resources.

In addition, the polling instruction may further indicate a feedback resource to be used for feedback by a terminal which will not be registered.

Optionally, the polling instruction may indicate a dedicated access resource, and then a terminal with high service priority may access using the dedicated access resource.

In S103, the terminal 20 is registered according to the polling instruction.

If the polling instruction indicates the dedicated access resource and the terminal 20 is a terminal with high service priority (determined by service subscription information of the terminal), the terminal 20 is registered directly using the dedicated access resource.

For example, if the terminal 20 receives polling instructions from multiple base stations in S102, the terminal 20 firstly selects one base station from the multiple base stations for registration. It is supposed that the selected base station is the base station 10.

It is appreciated that if the terminal 20 receives multiple pieces of cell broadcast information from multiple base stations in S101 and receives multiple polling instructions from the multiple base stations in S102, then the terminal 20 calculates a 25 transmission path loss between the terminal 20 and each base station in the multiple base stations according to the received information and further selects one base station from the multiple base stations for registration according to the transmission path loss between the terminal 20 and the each base station in the multiple base stations in S103.

Here, a method by which the terminal 20 calculates a transmission loss between the terminal 20 and the base station 10 is described as follows.

It is supposed that the terminal 20 and the base station 10 use the same frequency, for example, a Time Division Duplex (TDD) system Here, the cell broadcast information sent by the base station 10 in S101 includes indication information of downlink transmitted power. For example, the downlink transmitted power is total transmitted power of the cell and transmitted power of a sequence (such as a common reference signal or a beacon signal) with a known content and time length at a certain time and a certain frequency location. It is to be noted that geographically adjacent but different base stations send respective sequences at different time and different frequency locations in the embodiment of the present disclosure, so that interference between different base stations may be reduced. That is, different base stations may use different sequences.

Then, when receiving the cell broadcast information from the base station 10, the terminal 20 may estimate the received power, thereby determining actual received power with which the terminal 20 receives the cell broadcast information. Then, the terminal 20 may calculate the transmission path loss between the terminal 20 and the base station 10 according to the downlink transmitted power and the actual received power. Specifically, the terminal 20 may perform calculation according to a difference between the downlink transmitted power and the actual received power.

For improving the accuracy of calculation of the transmission path loss, the terminal 20 may receive the cell broadcast information for many times and smooth multiple estimated transmission path losses. Or, the terminal may cancel interference on the calculated transmission path loss to further improve the accuracy by virtue of received indication information of downlink transmitted power of another base station adjacent to the base station 10.

Then, the terminal 20 may determine the type of an access resource to be used according to the transmission path loss between the terminal 20 and the base station 10. Specifically, if the transmission path loss is higher than a preset loss threshold, the access resource to be used is determined to be a long access resource, otherwise is a normal access resource.

If the access resource to be used is determined to be a long access resource, the terminal 20 subsequently select an access resource from the multiple long access resources (the number is L, as mentioned above). If the access resource to be used is determined to be a normal access resource, the terminal 20 subsequently selects an access resource from the multiple normal access resources (the number is N, as mentioned above). If the selected access resource is a first access resource, the terminal 20 may subsequently be registered on the first access resource.

As an example, the terminal may select the first access resource from the multiple long access resources or the multiple normal access resources according to an ID of the terminal, the cell broadcast information and a timestamp at which the terminal receives the polling instruction. For example, the terminal 20 may generate a
characteristic sequence by adopting a hashing function according to the ID of the terminal, the cell broadcast information and the timestamp at which the terminal receives the polling instruction, determine the serial number information and location information of the access resource to be used according to the characteristic sequence, and determine the first access resource according to the serial number information and location information of the access resource to be used.

Here, the ID of the terminal may be an International Mobile Equipment Identity (IMEI). The hashing function may be a HASH function, such as Message Digest 5 (MD5).

Optionally, the characteristic sequence may be generated after subsequent processing by adopting the hashing function. The subsequent processing may be cyclic shift, random shift, Exclusive OR (XOR) with another sequence and the like.

Optionally, if the access resource is determined to be a long access resource, the terminal 20 may determine the serial number information and location information of the access resource to be used according to numerical value(s) of last $\lceil \log_2 \rceil$ bit(s) of the characteristic sequence in a binary form, wherein $\lceil \log_2 \rceil$ represents rounding up, and L represents the number of the long access resource. For example, last 4 bits are "1111b" when L=16, or are "1101b" when L=14. If the access resource is determined to be a normal access resource, the terminal 20 may determine the serial number information and location information of the access resource to be used according to the numerical value(s) of the last $\lceil \log_2 N \rceil$ bit(s) of the characteristic sequence in a binary form, wherein $\lceil \log_2 N \rceil$ represents rounding up, and N represents the number of the normal access resource.

In such a manner, in the embodiment of the present disclosure, it may be ensured that an access resource selected by each unregistered terminal is unique on time and frequency, and a possibility of a registration conflict between different terminals is very low.

Optionally, as an embodiment, after S102, the terminal 20 judges at first whether to initiate registration or not.

Specifically, the terminal 20 may judge whether to initiate registration or not according to an SFN where the polling instruction in S102 is located, an SFN which is found by the terminal during booting, the number of the access resources indicated by the polling instruction in S102, resource utilization during last polling S102, the utilization of resources during last polling before S102 and the like.

Here, the SFN found by the terminal 20 during booting may be included in the cell broadcast information.

In the embodiment of the present disclosure, the terminal 20 may set multiple judgment bases and calculate a value corresponding to each judgment basis, called as a characteristic value of the judgment basis. Then, the terminal 20 may calculate a judgment characteristic value according to the characteristic value of each judgment basis. Therefore, the terminal 20 may judge whether to initiate registration during this polling or not according to a magnitude of the judgment characteristic value, wherein initiation of registration may also be understood as initiation of an access request.

Specifically, if the judgment characteristic value is larger than a first threshold, registration is determined to be initiated during this polling. If the judgment characteristic value is smaller than the second threshold, registration is determined not to be initiated during this polling. The first threshold is larger than the second threshold. The first threshold and the second threshold may be determined by the base station according to a current cell state and sent to the terminal 20 via the polling instruction. If the base station 10 does not send the first threshold or the second threshold in the polling instruction, the terminal 20 may automatically calculate and determine the first threshold and the second threshold according to the cell broadcast information and the cell resource utilization.

Optionally, an absolute value of a difference between the SFN of the polling instruction in S102 and the SFN found by the terminal during booting may be determined as a characteristic value of a first judgment basis. The number of the access resources indicated by the polling instruction in S102 may be determined as a characteristic value of a second judgment basis. A reciprocal of a resource utilization ratio during last polling before S102 may be determined as a characteristic value of a third judgment basis.

In addition, the number of times of registration delay of the terminal 20 may be stored in the terminal 20, and may be indicated by a counter. Here, the number of times of the registration delay (a value of the counter) may be determined as a characteristic value of a fourth judgment basis.

It is appreciated that: if the absolute value of the difference between the SFN at where the polling instruction is located and the SFN found by the terminal during booting is larger, it is indicated that a time for which the terminal 20 may not be registered is longer, and a priority with which the terminal 20 initiates registration during this polling is higher. If the number of times of the registration delay is larger, that is, the value of the counter is larger, it is indicated that the number of times of polling during which the terminal 20 fails to be registered is larger, and the priority with which the terminal 20 initiates registration during this polling is higher.

It is appreciated that, if the number of the access resources indicated by the polling instruction in S102 is larger, or, the resource utilization ratio during last polling before S102 is lower, it is indicated that there are more available resources during this polling, and a success rate of registration of the terminal 20 during this polling is higher. Therefore, the terminal 20 may determine a sum of the characteristic value of each judgment basis as the judgment characteristic value, or, the terminal 20 may determine a weighted sum of the characteristic value of each judgment basis as the judgment characteristic value.

Here, a weight (also called as a weighted coefficient) of the characteristic value of each judgment basis may be sent to the terminal 20 by the base station 10 via the cell broadcast information. Specifically, the base station 10 may regulate the weight according to the factors including the MTC service characteristic, the cell resource utilization rate and the like (that is, different cell broadcast information may include different weights), so that service demands of a system may be met, and access efficiency of the terminal may be improved. Or, if the cell broadcast information does not include any weight, the weights (also called as the weighted coefficients) may also be determined by the terminal 20 according to the factors such as the MTC service characteristic, which will not be limited herein.

Furthermore, if the judgment characteristic value is larger than the first threshold, registration is determined to be initiated during this polling. After determining to initiate registration, the terminal 20 may be registered by adopting the abovementioned method. Moreover, after successful registration, the counter (the number of times of the registration delay) may be cleared. Optionally, the terminal 20 may also execute the characteristic value of each judgment basis during execution of registration to the base station 10 after successful registration.

If the judgment characteristic value is smaller than the second threshold, registration is determined not to be initiated during this polling. Then, the terminal 20 may update the counter (the number of times of the registration delay), that is, 1 is added to the counter. The terminal 20 may also send the characteristic value of each judgment basis to the base station 10. It is appreciated that the characteristic value, sent to the base station 10 by the terminal 20, of the fourth judgment basis refers to an updated value of the counter.

For example, the terminal 20 may select an access resource (which is supposed to be a second access resource) from the multiple access resources indicated by the polling instruction according to the calculated transmission path loss between the terminal 20 and the base station 10, and the terminal 20 sends a feedback message to the base station 10 on the second access resource to enable the base station 10 to learn about that the terminal 20 determines not to initiate registration during this polling, wherein the feedback message may be sent at a specific symbol of the second access resource, and the feedback message may be a specific signal, such as "1" or another short sequence. Therefore, resources may be saved, feedback accuracy may be improved, and a subsequent processing process of the base station may be simplified.

For example, if the polling instruction in S102 also indicates a feedback resource, the terminal 20 may send the feedback message to the base station 10 using the feedback resource when determining not to initiate registration, wherein the feedback message may include indication information about that the terminal 20 is not to be registered. Therefore, the base station 10 may subsequently perform network optimization according to the feedback message to increase a success rate of registration of the terminal 20 during next polling.

For example, the terminal 20 may select an access resource, which is supposed to be a third access resource, from the multiple access resources. The terminal 20 may reserve a period of time of a front end of the third access resource and then perform monitoring at the reserved time. If the terminal 20 finds existence of a characteristic sequence at the reserved time, the terminal 20 may determine to delay registration. Then, the terminal 20 may sends the feedback message, wherein the feedback message includes indication information about that the terminal 20 delays registration. It is appreciated that the characteristic sequence monitored at the reserved time is sent by another terminal which has been registered, that is, the terminal 20 determines not to perform registration during this polling to avoid a conflict with the another terminal on the third access resource.

In such a manner, the base station 10 may perform further processing according to the feedback message after receiving the feedback message. For example, the base station 10 may receive multiple feedback messages from multiple terminals, and the base station 10 may estimate the number of terminals which send "abandon to access" messages according to the distribution and power of signals in the multiple feedback messages and determine the time of next polling and the allocated access resources based on information such as a radio resource allocation condition of a current cell to improve system efficiency as much as possible on the premise of meeting an MTC service requirement. That is, the base station 10 may regulate information about access resources indicated by a polling instruction to be sent next time according to the feedback message.

In addition, the feedback message sent to the base station 10 by the terminal 20 may further include a reason why the terminal 20 does not initiate registration. If the reason indicates that there are insufficient radio resources left in the current cell and a request from an unregistered terminal cannot be met, then the base station 10 may make a report to a network and an MTC server so as to enable a service provider to expand capacity or take other subsequent measure after receiving the feedback message. That is, the base station 10 may send alarming information to the network equipment for subsequent capacity expansion over the base station.

It is to be noted that the embodiment shown in FIG. 1 does not describe a process that the terminal 20 does not initiate registration, or a process that the base station 10 receives the feedback message, and the like. In the embodiment shown in FIG. 1, it is supposed that the terminal 20 executes a registration process.

In S104, the terminal 20 sends registration information to the base station 10. As an example, the terminal 20 may estimate a distance between the terminal 20 and the base station 10 according to the calculated transmission path loss between the terminal 20 and the base station 10 and according to the cell transmission environment type in the cell broadcast information, and thus may further calculate a time advance value for the terminal 20 to send registration information. Then, the terminal 20 sends the registration information according to the time advance value in S104.

As another example, the terminal 20 may estimate transmitted power which can ensure the base station 10 to correctly demodulate the reporting information according to the calculated transmission path loss between the terminal 20 and the base station 10 and a modulation and coding scheme of a reporting message, and moreover, may add a certain allowance to the calculated transmitted power for transmission by taking the transmitted power with the allowance as uplink transmitted power.

As a combination of the two examples, the terminal 20 may send the registration information to the base station 10 by adopting the uplink transmitted power and utilizing the time advance value.

Optionally, after S104, if the terminal 20 does not receive a response message from the base station 10 within a preset time length, the terminal 20 resends the registration information. The terminal 20 may resend the registration information at a specific time, wherein the response message may be an Acknowledgement (ACK) or a Negative Acknowledgement (NACK).

Optionally, if the response message from the base station 10 is still not received after a maximum number of resending times is reached, the terminal 20 enters a sleep state. The maximum number of the resending times may be preset to be, for example, 25.

Here, the registration information may include the ID of the terminal and the type of the terminal. For example, the ID of the terminal may be an IMEi. For example, the type of the terminal may include information about the speed of the terminal, the transmitted power of the terminal and the like. In addition, the type of the terminal may further include the capability of the terminal, for example, information about a delay requirement of the terminal and information about energy saving of the terminal.

In S105, the terminal 20 is subjected to authentication verification from the network equipment 30.

Specifically, after the terminal 20 completes initial registration, the network equipment 30 may send authentication indication information dedicated for the terminal 20 to the terminal 20 through the base station 10 to ask the terminal 20 to report a terminal identity and business registration information. The terminal identity may be an International Mobile Subscriber Identification Number (IMSI). Then, the terminal 20 sends the terminal identity and the business registration information to the base station 10, and the base station 10 forwards the terminal identity and the business registration information to the network equipment 30 to complete authentication verification. The business registration information may include a business type and service subscription information.

In addition, the terminal 20 may further send battery capacity information of the terminal 20 and uplink transmitted power level information of the terminal 20 to the base station 10. Then, the base station 10 may determine battery utilization of the terminal 20 and calculate a received power loss of the base station 10 according to the battery capacity information and the uplink transmitted power level information. On the other hand, if the base station 10 fails to demodulate the battery capacity information and the uplink transmitted power level information, the base station 10 may send instruction information to the terminal 20, the instruction information being used to instruct the terminal to increase the uplink transmitted power of the terminal.

In S106, the base station 10 allocates time-frequency reporting resources to the terminal 20.

After authentication verification is completed, the base station 10 may allocate a reporting manner to the terminal according to the business registration information of the terminal 20. The reporting manner may be periodic or non-periodic (a non-periodic manner may also be called as a configured or scheduling-based manner).

Here, the reporting manner includes time-frequency reporting resource information. Therefore, the terminal 20 may subsequently report data according to the time-frequency reporting resource information.

For a periodic manner, the time-frequency reporting resource information may include time-frequency resource location information and a reporting period. Or, for the periodic manner, the time-frequency reporting resource information includes a time-frequency resource sequence generation manner and a reporting period. For example, the time-frequency resource sequence generation manner may be a manner of generating two-dimensional time-frequency location sequences according to a numerical value of a seed.

Specifically, the base station 10 may determine the time-frequency resource location information or the time-frequency resource sequence generation manner by adopting a certain basis and a certain mathematical calculation method. The adopted basis may be a time-frequency resource location occupied by data reporting, such as a current cell resource allocation condition, cell information, a local ID of the terminal, a time (timestamp) at which initial system synchronization of the terminal occurs, or a combination thereof. The mathematical calculation method may be a hash function or a sequence function.

Specifically, the reporting period may be a fixed time interval. The time interval may be determined according to a business requirement of MTC, which for example, may be several seconds or several days.

For the non-periodic manner, the time-frequency reporting resource information includes the time-frequency resource location information and the number of reporting times. Here, if the number of reporting times is K, K may be any positive integer. For example, K=1 or K=1O. That is, the base station 10 notifies the terminal 20 of time-frequency resource information used for next or next K reporting.

Specifically, the base station 10 may allocate unique time-frequency reporting resource information to the terminal 20, that is, the base station 10 allocates different time-frequency resource location information to different terminals. Or, the base station 10 may allocate the same time-frequency reporting resource information to multiple terminals in a Multi-User Multi-Input Multi-Output (MU MIMO) manner transparent to the terminals by virtue of characteristics such as spatial isolation and the like. That is, the time-frequency reporting resource information allocated to the terminal 20 by the base station 10 may be the same as time-frequency reporting resource information allocated to another terminal by the base station 10. Therefore, the capacity of the system may be improved, and for an MTC system with fixed deployment locations, it is relatively easier to find multiple MTC terminals suitable for pairing, and a better effect thus can be achieved.

Optionally, as another example, the base station 10 may acquire multiple received power losses calculated by other multiple base stations and regarding to the terminal 20. The base station 10 may determine a location of the terminal 20 according to a received power loss of the base station 10, the multiple received power losses and transmission characteristics of regions where the base station 10 and the multiple other base stations are located, and further allocates the time-frequency reporting resource information to the terminal 20 according to the location of the terminal 20.

Here, the base station 10 may calculate a distance between the terminal 20 and each base station to further determine the location of the terminal 20. The transmission characteristic of each region may include a digital map and/or a transmission model of a place where the cell is located.

In S107, the base station 10 sends time-frequency reporting resource information to the terminal 20.

Before S107, the base station 10 may establish a wireless connection for the terminal 20. Here, the wireless connection may be a Radio Resource Connection (RRC), so that the terminal 20 is in a connected (RRC CONNECTED) state.

It is to be noted that the base station 10 does not initiatively release the wireless connection in the embodiment of the present disclosure. That is, after the wireless connection is established, the base station does not release the wireless connection even though the terminal 20 enters a long-term sleep state, so that noticeable signaling overhead brought by switching of connected states of a large number of MTC terminals may be avoided.

However, it is appreciated that the base station 10 may receive a termination request from the network equipment 30 or the terminal 20, and release the wireless connection according to the termination request after subsequent data transmission is ended. There are no limits to the reason why the network equipment 30 or the terminal 20 sends the termination request in the embodiment of the present disclosure. For example, the network equipment 30 may send the termination request to the base station 10 in case of lease expiration or overdue bill of an MTC service. For example, the terminal 20 may send alarming information and send the termination request to the base station 10 when battery power is lower than a preset power threshold. Here, the preset power threshold may be 5% or 3% of a battery capacity of the terminal 20.

Optionally, as an example, before S107, the base station 10 may allocate a unique identifier to the terminal 20 and send the identifier to the terminal 20 before or after S107 or at the same time of S107. A length of the identifier is smaller than a preset threshold, for example, the length of the identifier is smaller than a length of the ID of the terminal.

It is appreciated that the base station 10 acts as a local gateway at this moment. Specifically, the base station 10 may use part of characters of the ID of the terminal 20 as the unique identifier, or the base station 10 may determine a relatively shorter character generated by processing the ID of the terminal 20 through the hash function and the like as the unique identifier. For example, a 16 bit identifier may represent 65535 terminals.

Then, the base station 10 may encode an address for the terminal 20 by virtue of the unique identifier and replace the ID of the terminal 20 with the unique identifier in a paging process for the terminal 20. In such a manner, replacing an ID with a relatively larger length with an identifier with a relatively smaller length in the embodiment may save transmission resources, and may further reduce a battery consumption speed of the terminal 20.

In addition, a length of the header of an Internet Protocol version 4 (1Pv4) packet is 24 bytes, therefore, even though a header compression algorithm such as Robust Header Compression (ROHC) is used, great overhead will still be brought for an MTC application which reports an extremely small amount of data, and service life of an equipment battery is greatly shortened. Therefore, before S107, the base station 10 may allocate a local short address to the terminal 20 and send the local short address to the network equipment 30.

It is to be noted that the local short address in the embodiment of the present disclosure may be an IP address, for example, 1O.x.x.x. Or, the local short address in the embodiment of the present disclosure may also be an ID. A local short address in the ID form may be a numerical value which is set according to the capacity of the base station and is much shorter than the ID (such as IMEi) of the terminal, for example, a serial number from O to 4,095 indicated by a 12 bit binary number. Or, the local short address in the embodiment of the present disclosure may also adopt another form, which will not be limited herein.

Moreover, the base station 10 establishes a corresponding relationship between an identifier and a local short address. It is appreciated that the base station 10 is responsible for address translation in a subsequent data transmission process.

Specifically, the base station 10 receives an uplink data packet from the terminal, the uplink data packet including an identifier. The base station 10 replaces the identifier with the local short address and sends the local short address to the network equipment 30. That is, the base station 10 fills the data packet sent to the network equipment 30 by the terminal 20 with a local short address corresponding to the identifier, and determines the local short address as a sending party address of the data packet.

The base station 10 receives a downlink data packet from the network equipment 30, the downlink data packet including the local short address allocated to the terminal. The base station 10 replaces the local short address with the ID and sends the ID to the terminal 20. That is, the base station 10 unpacks the data packet sent to the terminal 20 by the network equipment 30, and adds the ID to a payload part in the data packet and then sends the payload part to the terminal 20.

Or, as another example, the terminal 20 may communicate with the base station 10 through a local IP address of the terminal 20, and the base station 10 may communicate with the network equipment 30 through a local short address. Then, it is appreciated that the base station 10 establishes a corresponding relationship between the local IP address of the terminal 20 and the local short address. Moreover, the base station 10 undertakes the task of translating the two addresses, i.e. the local IP address of the terminal 20 and the local short address, in the subsequent data transmission process.

In S108, the terminal 20 determines a time-frequency reporting resource.

If the time-frequency reporting resource information in S107 includes time-frequency resource location information and a reporting period, the terminal 20 may determine the time-frequency reporting resource according to the time-frequency resource location information.

If the time-frequency reporting resource information in S107 includes time-frequency resource sequence generation manner and a reporting period, the terminal 20 may generate a time-frequency resource sequence according to the time-frequency resource sequence generation manner, and select the time-frequency reporting resource from the time-frequency resource sequence.

If the time-frequency reporting resource information in S107 includes time-frequency resource location information and the number of reporting times, the terminal 20 may determine the time-frequency reporting resource according to the time-frequency resource location information.

In S109, the terminal 20 sends an uplink data packet to the base station.

Specifically, the terminal 20 sends the uplink data packet according to the time-frequency reporting resource determined in S108.

If the time-frequency reporting resource information in S107 includes information of a time-frequency resource location and a reporting period, the terminal 20 may periodically send the uplink data packet to the base station 10 by the reporting period at the time-frequency resource location.

If the time-frequency reporting resource information in S107 includes time-frequency resource sequence generation manner and a reporting period, the terminal 20 may generate the time-frequency resource sequence according to the time-frequency resource sequence generation manner, and send the uplink data packet to the base station 10 by the reporting period at the time-frequency resource sequence.

If the time-frequency reporting resource information in S107 includes information of a time-frequency resource location and the number of reporting times, the terminal 20 may periodically send the uplink data packet to the base station 10 at the time-frequency resource location, and the number of sending times is the number of reporting times.

In addition, the terminal 20 may also send the uplink data packet to the base station on the basis of event triggering. Reporting based on event triggering has higher priority than the reporting based on the time-frequency reporting resource information. It is to be noted that the base station 10 may contain a priority instruction in the cell broadcast information or the polling instruction to enable the terminal 20 to learn about that event-triggering-based reporting has higher priority. Correspondingly, the message sent to the base station 10 by the terminal 20 may also include priority indication information. In such a manner, the base station 10 may perform timely processing and give a response when receiving a high-priority message.

For example, event-triggering-based reporting may be that: a motion induction sensor detects a moving object, or a dangerous chemical sensor detects leakage, and the like.

It is to be noted that the terminal 20 may send a scheduling request to the base station 10 to enable the base station 10 to reallocate suitable time-frequency reporting resources to the terminal 20 in S109 if there are insufficient time-frequency reporting resources, that is, if the time-frequency reporting resources are insufficient to accommodate the uplink data packet.

Optionally, in the embodiment of the present disclosure, after S109, the terminal 20 may enter the sleep state. That is, the terminal 20 may enter the sleep state after the process of reporting the uplink data packet is ended, until the next scheduling time comes. Accordingly, energy resources may be saved, and specifically, power of the terminal 20 may be saved.

However, since accuracy of a local clock source of the terminal 20 is usually lower and a sleep time of the terminal 20 is usually long, for example, several days, the terminal 20 performs time calibration first after the terminal wakes up from sleep.

Specifically, the base station 10 may locally maintain a relative time offset, and moreover, the base station 10 may send the relative time offset in a broadcast manner. For example, a periodic or regular sending manner may be adopted. Here, the relative time offset is an SFN. It is appreciated that the relative time offset may not be an absolute time here.

After waking up from the sleep state, the terminal 20 monitors the relative time offset sent by the base station 10, and may perform time calibration according to a stored time reference and the relative time offset.

For example, the terminal 20 may wake up one or more SFN periods before the reporting time to listen to SFN information, and then compare it with the time reference stored when the terminal 20 is registered or the base station 10 initiates time synchronization to determine a time deviation and perform time calibration. The time reference may be a deviation of x microseconds from a received SFN. The base station 10 maintains the relative time offset (such as the SFN). The base station 10 may acquire the absolute time through a Global Positioning System (GPS), a network time protocol and the like, and may further learn about the specific reporting time of the terminal 20 according to the relative time offset.

In such a manner, in the embodiment, after the terminal 20 completes registration, the base station 10 may initiate a time regulation instruction to implement time synchronization. Then, every time when waking up from sleep, the terminal 20 re-performs time synchronization with the base station 10 according to the relative time offset, thereby ensuring sending of reporting data at a correct time.

It can be seen that such a time calibration method may be considered to have enough accuracy because a wireless transmission path may be considered to be kept unchanged and a transmission delay is basically kept unchanged under the condition that the terminal is kept still after being deployed and the base station is kept unchanged in location. When necessary (for example, the reporting information is not completely received), the base station may initiate time synchronization with the terminal to implement time calibration.

Figure 2:
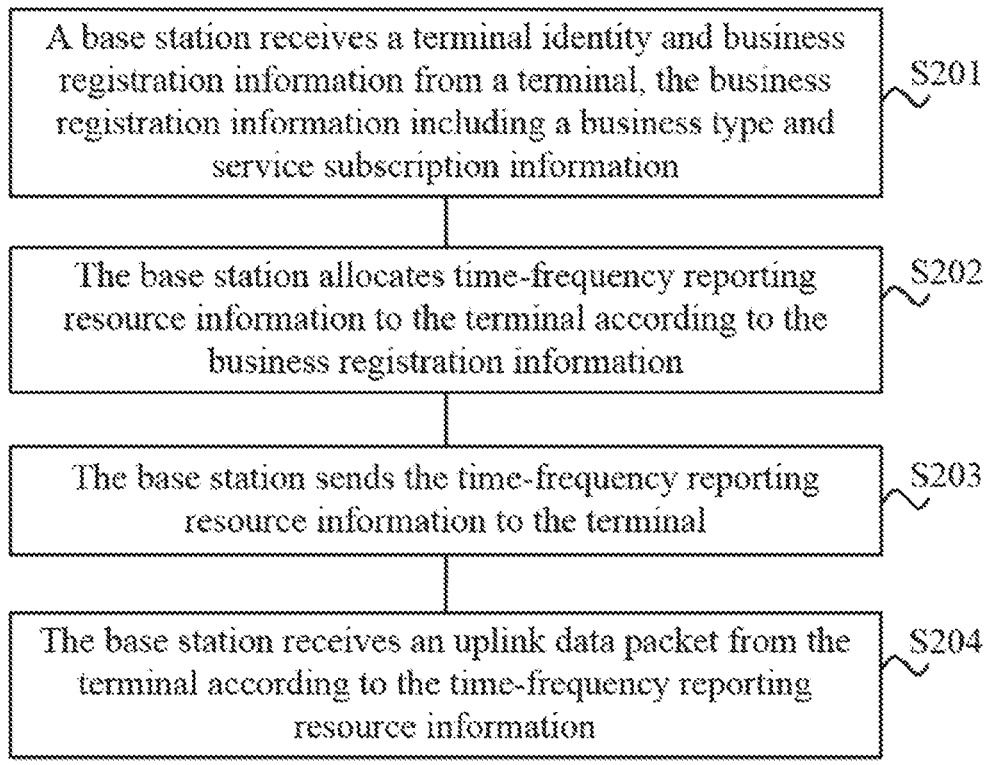
FIG. 2 is a flowchart of an MTC method according to another embodiment of the present disclosure.

Based on the above analysis, the MTC method in the embodiment of the present disclosure may be applied to a large-scale machine communication system Terminal registration and scheduling processes therein are simple and consistent, the complexity, power consumption and occupied system resources of a machine communication terminal can be reduced, the deployment cost of an MTC system can be reduced, the service life of battery-powered equipment can be prolonged, and it is beneficial for the application of a future large-scale wireless machine communication system FIG. 2 is a flowchart of an MTC method according to another embodiment of the present disclosure. The method shown in FIG. 2 includes the following processes.

In S201, a base station receives a terminal identity and business registration information from a terminal, the business registration information including a business type and service subscription information.

In S202, the base station allocates time-frequency reporting resource information to the terminal according to the business registration information.

In S203, the base station sends the time-frequency reporting resource information to the terminal.

In S204, the base station receives an uplink data packet from the terminal according to the time-frequency reporting resource information.

In the embodiment of the present disclosure, the base station allocates the time-frequency reporting resource information to the terminal to ensure that the terminal sends an uplink data packet to the base station. Such a scheduling process is simple and consistent, which can reduce complexity and power consumption and occupied system resources of a machine communication terminal, and can reduce deployment cost of an MTC system and prolong service life of battery-powered equipment.

In the embodiment of the present disclosure, before S201, a process that the terminal is registered and subjected to authentication verification may be included. After registration of the terminal, the following operation may further be included: the base station receives registration information from the terminal. The registration process of the terminal may refer to descriptions about S102 to S104 in the embodiment shown in FIG. 1, the authentication verification and S201 may refer to descriptions about S105 in the embodiment shown in FIG. 1, and they will not be repeated here.

In addition, before or after S201 or at the same time of execution of S201, the following operations may further be included: battery capacity information and uplink transmitted power level information sent by the terminal are received. According to the battery capacity information and the uplink transmitted power level information, a battery utilization condition of the terminal is determined and a received power loss of the base station is calculated. Moreover, if the battery capacity information and the uplink transmitted power level information are failed to be demodulated, instruction information is sent to the terminal, the instruction information being used to instruct the terminal to improve uplink transmitted power.

It is appreciated that the base station information allocates the time-frequency reporting resource information to the terminal corresponding to the terminal identity according to the business registration information in S202.

Optionally, the time-frequency reporting resource information in S202 may include time-frequency resource location information and a reporting period. Or, the time-frequency reporting resource information may include a time-frequency resource sequence generation manner and a reporting period. Or, the time-frequency reporting resource information may include time-frequency resource location information and the number of reporting times.

Moreover, the time-frequency reporting resource information may be the same as time-frequency reporting resource information allocated to another terminal by the base station.

In the embodiment of the present disclosure, S202 may refer to descriptions about S106 in the embodiment shown in FIG. 1, and will not be repeated here.

Optionally, before S203, the following operation may further be included: a wireless connection is established for the terminal, and the base station does not initiatively release the wireless connection. Correspondingly, it is appreciated that a termination request sent by network equipment or the terminal may be received thereafter and the wireless connection is released according to the termination request.

In the embodiment of the present disclosure, S203 may refer to descriptions about S107 in the embodiment shown in FIG. 1, and will not be repeated here.

Optionally, as an embodiment, the method shown in FIG. 2 may further include the following operations: a unique identifier is allocated to the terminal, a length of the identifier being smaller than a preset threshold; a local short address is allocated to the terminal; a corresponding relationship between the identifier and the local short address is established; and the identifier is sent to the terminal, and the local short address is sent to the network equipment. Such a process may be executed after S105, and for example, may be executed before or after S107, which will not be limited in the embodiment.

In such a manner, after receiving the uplink data packet including the identifier from the terminal, the base station may replace the identifier with the local short address and forward the replaced uplink data packet to the network equipment. Similarly, after receiving a downlink data packet including the local short address from the network equipment, the base station may replace the local short address in the downlink data packet with the identifier and forward the replaced downlink data packet to the terminal.

In the embodiment of the present disclosure, S204 may refer to descriptions about S109 in the embodiment shown in FIG. 1, and will not be repeated here.

In addition, since the terminal may get into sleep after completing data transmission, the base station may send a relative time offset to the terminal to enable the terminal to perform time calibration according to the relative time offset after the terminal wakes up from sleep. Specifically, the base station may periodically send the relative time offset in a broadcast manner. The relative time offset may be an SFN.

In such a manner, in the embodiment of the present disclosure, the base station allocates the time-frequency reporting resource information to the terminal to ensure that the terminal sends the uplink data packet to the base station. Such a scheduling process is simple and consistent, which can reduce the complexity and power consumption and occupied system resources of the machine communication terminal, and can reduce the deployment cost of the MTC system and prolong the service life of the battery-powered equipment.

Figure 3:
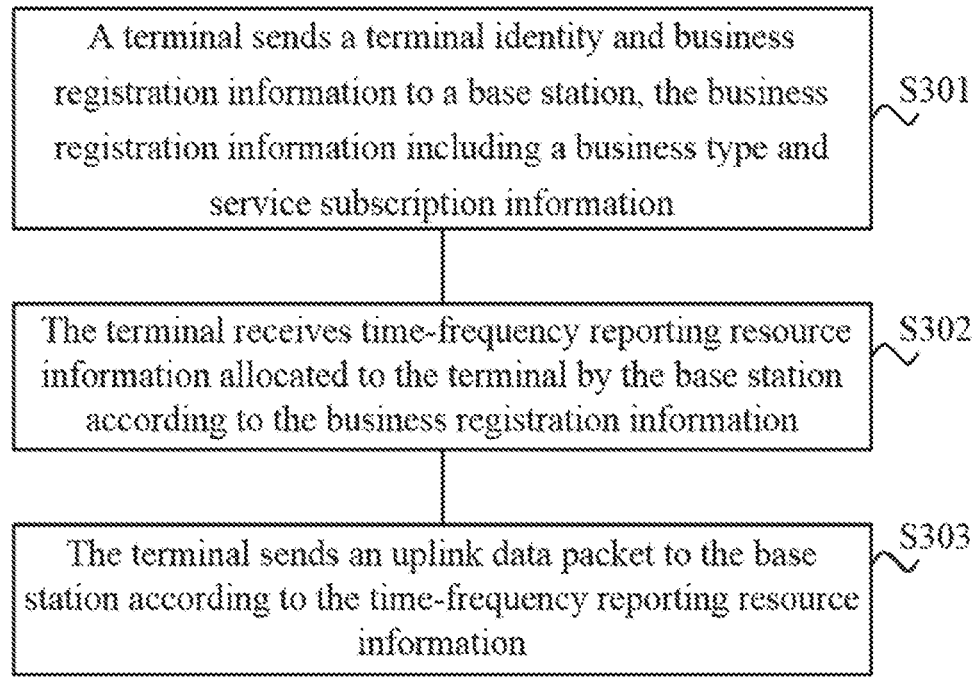
FIG. 3 is a flowchart of an MTC method according to another embodiment of the present disclosure.

FIG. 3 is a flowchart of an MTC method according to another embodiment of the present disclosure. The method shown in FIG. 3 includes the following processes.

In S301, a terminal sends a terminal identity and business registration information to a base station, the business registration information including a business type and service subscription information.

In S302, the terminal receives time-frequency reporting resource information allocated to the terminal by the base station according to the business registration information.

In S303, the terminal sends an uplink data packet to the base station according to the time-frequency reporting resource information.

In the embodiment of the present disclosure, the terminal acquires the time-frequency reporting resource information allocated by the base station, and sends the uplink data packet to the base station. Such a scheduling process is simple and consistent, which can reduce complexity and power consumption and occupied system resources of a machine communication terminal, and can reduce deployment cost of an MTC system and prolong the service life of battery-powered equipment.

In the embodiment of the present disclosure, before S301, the terminal may be registered and subjected to authentication verification. The registration process of the terminal may refer to descriptions about S102 to S104 in the embodiment shown in FIG. 1, and the authentication verification and S301 may refer to descriptions about S105 in the embodiment shown in FIG. 1, both of which will not be repeated here.

Optionally, before or after S301 or at the same time of execution of S301, the following operation may further be included: battery capacity information and uplink transmitted power level information of the terminal are sent to the base station to enable the base station to determine a battery utilization condition of the terminal and calculate a received power loss of the base station according to the battery capacity information and the uplink transmitted power level information.

Since the base station may receive business registration information from multiple terminals, it is appreciated that the terminal identity in S301 is used for the base station to identify the terminal.

It is appreciated that the following operation is further included before S302: a wireless connection is established with the base station, and the base station does not initiatively release the wireless connection. Here, the wireless connection may be an RRC. After the embodiment shown in FIG. 3, when battery power of the terminal is lower than a preset power threshold, alarming information is sent, and a termination request is sent to the base station to enable the base station to release the wireless connection according to the termination request.

Optionally, the time-frequency reporting resource information in S302 may include time-frequency resource location information and a reporting period. Or, the time-frequency reporting resource information may include a time-frequency resource sequence generation manner and a reporting period. Or, the time-frequency reporting resource information may include the time-frequency resource location information and the number of reporting times.

Moreover, the time-frequency reporting resource information may be the same as time-frequency reporting resource information allocated to another terminal by the base station.

In the embodiment of the present disclosure, S302 may refer to descriptions about S107 in the embodiment shown in FIG. 1, and will not be repeated here.

Correspondingly, in S303, if the time-frequency reporting resource information includes the time-frequency resource location information and the reporting period, the terminal may periodically send the uplink data packet to the base station by taking the reporting period at a corresponding time-frequency resource location. If the time-frequency reporting resource information includes the time-frequency resource sequence generation manner and the reporting period, the terminal may generate a time-frequency resource sequence according to the time-frequency resource sequence generation manner, and send the uplink data packet to the base station by taking the reporting period at the time-frequency resource sequence. If the time-frequency reporting resource information includes the time-frequency resource location information and the number of reporting times, the terminal may periodically send the uplink data packet to the base station at the time-frequency resource location, and the number of sending times is the number of reporting times.

In addition, before S303, the terminal may receive an identifier from the base station, a length of the identifier being smaller than a preset threshold. Then, the terminal may include the identifier in the uplink data packet sent in S303.

In the embodiment of the present disclosure, S303 may refer to descriptions about S109 in the embodiment shown in FIG. 1, and will not be repeated here.

Optionally, after S303, the terminal may enter a sleep state. Then, after waking up from the sleep state, the terminal monitors a relative time offset sent by the base station, and performs time calibration according to a stored time reference and the relative time offset. The relative time offset may be an SFN.

In such a manner, in the embodiment of the present disclosure, the terminal acquires the time-frequency reporting resource information allocated by the base station, and sends the uplink data packet to the base station. Such a scheduling process is simple and consistent, which can reduce the complexity and power consumption and occupied system resources of the machine communication terminal, and can reduce the deployment cost of the MTC system and prolong the service life of the battery-powered equipment.

Figure 4:
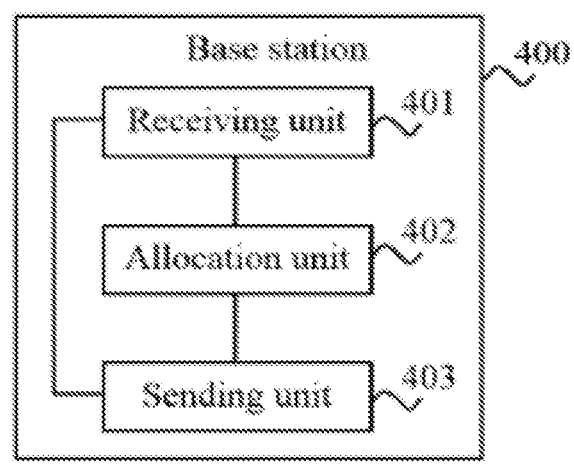
FIG. 4 is a block diagram of a base station according to an embodiment of the present disclosure.

FIG. 4 is a block diagram of a base station according to an embodiment of the present disclosure. The base station 400 shown in FIG. 4 includes a receiving unit 401, an allocation unit 402 and a sending unit 403.

The receiving unit 401 is arranged to receive a terminal identity and business registration information from a terminal, the business registration information including a business type and service subscription information.

The allocation unit 402 is arranged to allocate time-frequency reporting resource information to the terminal according to the business registration information received by the receiving unit 401.

The sending unit 403 is arranged to send the time-frequency reporting resource information allocated by the allocation unit 402 to the terminal.

The receiving unit 401 is further arranged to receive an uplink data packet from the terminal according to the time-frequency reporting resource information.

In the embodiment of the present disclosure, the base station allocates the time-frequency reporting resource information to the terminal to ensure that the terminal sends the uplink data packet to the base station. Such a scheduling process is simple and consistent, which can reduce complexity and power consumption and occupied system resources of a machine communication terminal, and can reduce deployment cost of an MTC system and prolong the service life of battery-powered equipment.

Optionally, as an embodiment, the base station 400 may further include an establishment unit, arranged to establish a wireless connection for the terminal, and the base station may not initiatively release the wireless connection.

Optionally, as another embodiment, the base station 400 may further include a release unit. The receiving unit 401 is further arranged to receive a termination request from network equipment or the terminal. The release unit is arranged to release the wireless connection according to the termination request received by the receiving unit 401. The network equipment is any one of: a wireless access network, a subscriber identity data server (such as an HLR), an authentication server and an MTC service subscription server.

Optionally, as another embodiment, the time-frequency reporting resource information includes time-frequency resource location information and a reporting period. Or, the time-frequency reporting resource information includes a time-frequency resource sequence generation manner and a reporting period. Or, the time-frequency reporting resource information includes time-frequency resource location information and the number of reporting times.

Optionally, as another embodiment, the time-frequency reporting resource information is the same as time-frequency reporting resource information allocated to another terminal by the allocation unit.

Optionally, as another embodiment, the sending unit 403 may further be arranged to send a relative time offset to the terminal to enable the terminal to perform time calibration according to the relative time offset after the terminal wakes up from sleep. The relative time offset may be an SFN.

Optionally, as another embodiment, the base station 400 may further include an establishment unit. The allocation unit 402 is further arranged to allocate a unique identifier to the terminal, a length of the identifier being smaller than a preset threshold, and is arranged to allocate a local short address to the terminal. The establishment unit is arranged to establish a corresponding relationship between the identifier and the local short address. The sending unit 403 is further arranged to send the identifier to the terminal and send the local short address to the network equipment.

Optionally, as another embodiment, the uplink data packet includes the identifier of the terminal, and the sending unit 403 is further arranged to replace the identifier with the local short address and forward the replaced uplink data packet to the network equipment.

Optionally, as another embodiment, the receiving unit 401 is further arranged to receive a downlink data packet from the network equipment, the downlink data packet including the local short address. The sending unit 403 is further arranged to replace the local short address in the downlink data packet with the identifier and forward the replaced downlink data packet to the terminal.

Optionally, as another embodiment, the base station 400 may further include a determination unit. The receiving unit 401 is further arranged to receive battery capacity information and uplink transmitted power level information from the terminal. The determination unit is arranged to determine a battery utilization condition of the terminal and calculate a received power loss of the base station according to the battery capacity information and the uplink transmitted power level information.

Moreover, if the battery capacity information and the uplink transmitted power level information are failed to be demodulated, the sending unit 403 is further arranged to send instruction information to the terminal, the instruction information being used to instruct the terminal to improve uplink transmitted power.

Figure 5:
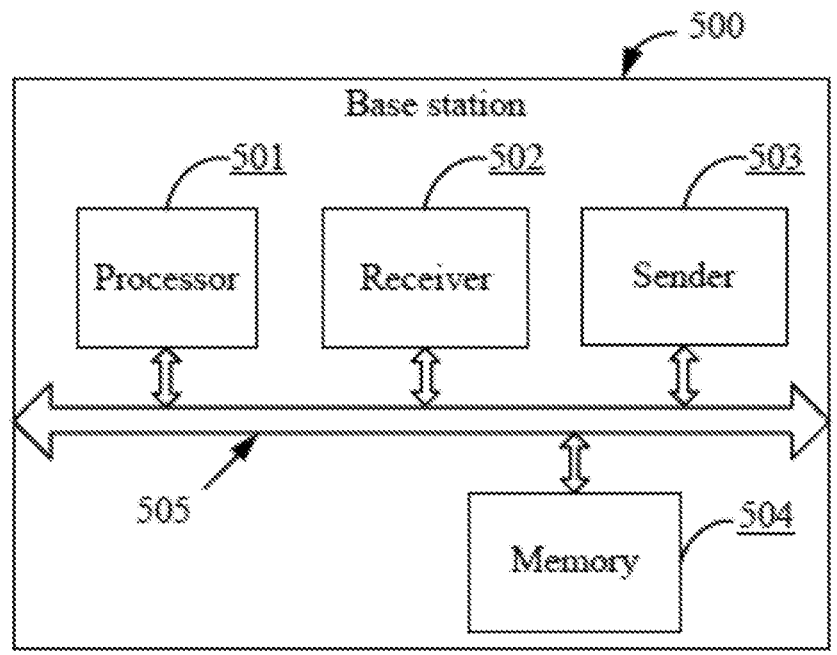
FIG. 5 is a block diagram of a base station according to another embodiment of the present disclosure.

It is to be noted that: in the embodiment of the present disclosure, the receiving unit 401 may be implemented by a receiver; the sending unit 403 may be implemented by a sender; and the allocation unit 402, the establishment unit, the release unit and the determination unit may be implemented by a processor. As shown in FIG. 5, a base station 500 may include a processor 501, a receiver 502, a sender 503 and a memory 504. The memory 504 may be arranged to store codes and the like executable by the processor 501.

Each component in the base station 500 is coupled together through a bus system 505. The bus system 505 further includes a power bus, a control bus and a state signal bus, besides a data bus.

The base station 400 shown in FIG. 4 or the base station 500 shown in FIG. 5 may implement each process implemented by the base station in the embodiments shown in FIG. 1 and FIG. 2, and will not be repeated here.

Figure 6:
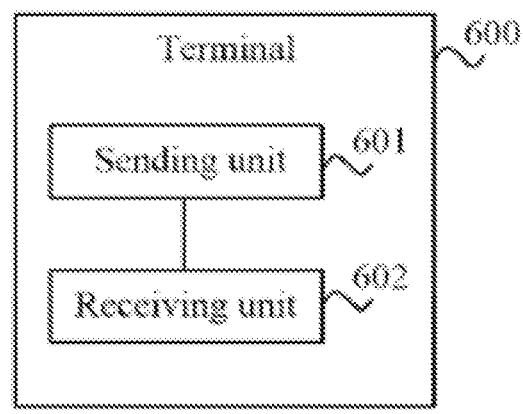
FIG. 6 is a block diagram of a terminal according to an embodiment of the present disclosure.

FIG. 6 is a block diagram of a terminal according to an embodiment of the present disclosure. The terminal 600 shown in FIG. 6 includes a sending unit 601 and a receiving unit 602.

The sending unit 601 is arranged to send a terminal identity and business registration information to a base station, the business registration information including a business type and service subscription information.

The receiving unit 602 is arranged to receive time-frequency reporting resource information allocated to the terminal by the base station according to the business registration information sent by the sending unit 601.

The sending unit 601 is further arranged to send an uplink data packet to the base station according to the time-frequency reporting resource information.

In the embodiment of the present disclosure, the terminal acquires the time-frequency reporting resource information allocated by the base station, and sends the uplink data packet to the base station. Such a scheduling process is simple and consistent, which can reduce complexity and power consumption and occupied system resources of a machine communication terminal, and can reduce deployment cost of an MTC system and prolong the service life of battery-powered equipment.

Optionally, as an embodiment, the receiving unit 602 is further arranged to receive an identifier from the base station, a length of the identifier being smaller than a preset threshold. The uplink data packet includes the identifier.

Optionally, as another embodiment, the time-frequency reporting resource information includes information of a time-frequency resource location and a reporting period. The sending unit 601 is specifically arranged to periodically send the uplink data packet to the base station by taking the reporting period at the time-frequency resource location.

Optionally, as another embodiment, the time-frequency reporting resource information includes a time-frequency resource sequence generation manner and a reporting period. The sending unit 601 is specifically arranged to generate a time-frequency resource sequence according to the time-frequency resource sequence generation manner, and send the uplink data packet to the base station by taking the reporting period at the time-frequency resource sequence.

Optionally, as another embodiment, the time-frequency reporting resource information includes information of a time-frequency resource location and the number of reporting times. The sending unit 601 is specifically arranged to periodically send the uplink data packet to the base station at the time-frequency resource location, the number of sending times being the number of reporting times.

Optionally, as another embodiment, the sending unit 601 may further be arranged to send battery capacity information and uplink transmitted power level information of the terminal to the base station to enable the base station to determine a battery utilization condition of the terminal and calculate a received power loss of the base station according to the battery capacity information and the uplink transmitted power level information.

Optionally, as another embodiment, the terminal 600 may further include a processing unit, arranged to enter a sleep state after the uplink data packet is sent.

Optionally, as another embodiment, the receiving unit 602 may further be arranged to monitor a relative time offset from the base station after the terminal wakes up from the sleep state. The processing unit may further be arranged to perform time calibration according to a stored time reference and the relative time offset. The relative time offset is an SFN.

Optionally, as another embodiment, the processing unit may further be arranged to establish a wireless connection with the base station.

Optionally, as another embodiment, the sending unit 601 may further be arranged to send alarming information and a termination request to the base station to enable the base station to release the wireless connection according to the termination request when battery power of the terminal is lower than a preset power threshold.

Figure 7:
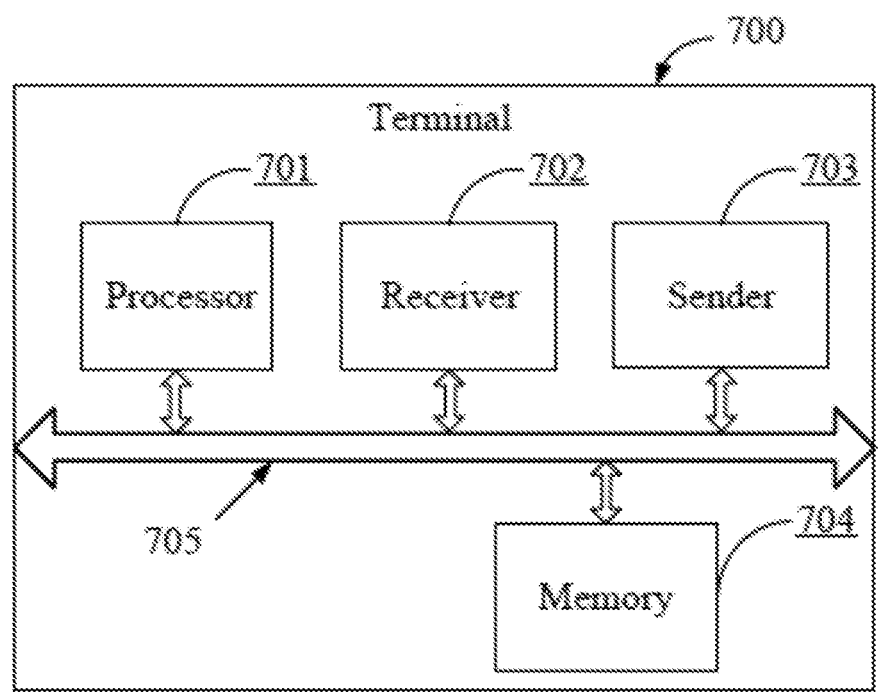
FIG. 7 is a block diagram of a terminal according to another embodiment of the present disclosure.

It is to be noted that in the embodiment of the present disclosure, the receiving unit 602 may be implemented by a receiver, the sending unit 601 may be implemented by a sender and the processing unit may be implemented by a processor. As shown in FIG. 7, a terminal 700 may include a processor 701, a receiver 702, a sender 703 and a memory 704. The memory 704 may be arranged to store the time reference, and may further be arranged to store codes and the like executable by the processor 701.

Each component in the terminal 700 is coupled together through a bus system 705. The bus system 705 further includes a power bus, a control bus and a state signal bus, besides a data bus.

The terminal 600 shown in FIG. 6 or the terminal 700 shown in FIG. 7 may implement each process implemented by the terminal in the embodiments shown in FIG. 1 and FIG. 3, and will not be repeated here.

It is to be noted that the method embodiments of the present disclosure may be applied to a processor or implemented by the processor. The processor may be an integrated circuit chip, and has a signal processing capability. In an implementation process, each process of the method embodiments may be implemented by an integrated logic circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logic device, discrete gate or transistor logic device and discrete hardware component. Each method, process and logic block diagram disclosed in the embodiments of the present disclosure may be implemented or executed. The universal processor may be a microprocessor or any conventional processor and the like. The processes of the method disclosed in the embodiments of the present disclosure may directly be embodied as execution and implementation with a hardware decoding processor or with a combination of hardware and software module in the decoding processor. The software module may be located in a storage medium well known in the art such as a random memory, a flash memory, a Read-Only Memory (ROM), a Programmable ROM (PROM), or an Electrically Erasable PROM (EEPROM) and a register. The storage medium is located in a memory. The processor reads information in the memory, and implements the processes of the method in combination with the hardware.

It is appreciated that the memory in the embodiments of the present disclosure may be a volatile memory or a nonvolatile memory, or may include volatile and nonvolatile memories. The nonvolatile memory may be a ROM, a PROM, an Erasable PROM (EPROM), an EEPROM or a flash memory. The volatile memory may be a Random Access Memory (RAM), and serves as an external high-speed cache. Exemplarily but unlimitedly, various RAMs may be available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory for the system and method described in the present disclosure is intended to include, but not limited to, these memories and any other suitable memories.

Those skilled in the art may realize that the unit and algorithm processes of each example described in the embodiments disclosed in the present disclosure may be implemented by electronic hardware or a combination of computer software and the electronic hardware. Whether to realize these functions by hardware or software depends to specific application and design constraints of the technical solutions. Those skilled in the art may realize the described functions for each specific application by different methods, but such realization shall not be beyond the scope of the present disclosure.

Those skilled in the art may clearly know that specific working processes of the system, devices and units described above may refer to the corresponding processes in the method embodiments and will not be repeated here for convenient and brief description.

In some embodiments provided by the present disclosure, it is appreciated that the disclosed system, device and method may be implemented in another manner. For example, the device embodiment described above is only schematic. For example, division of the units is only division of logic functions, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, between the devices or the units, which may be electrical and mechanical or in other forms.

The abovementioned units described as separate parts may or may not be physically separated. The parts displayed as units may or may not be physical units, namely, the parts may be located in the same place, or may be distributed to multiple network units. Part or all of the units may be selected to implement the embodiments according to a practical requirement.

In addition, each function unit in each embodiment of the present disclosure may be integrated into a processing unit, each unit may also physically exist independently, and at least two units may also be integrated into a unit.

When being implemented in form of software function unit and sold or used as an independent product, the function may also be stored in a computer-readable storage medium Based on such an understanding, the technical solutions of the present disclosure substantially or parts making contributions to a conventional art or part of the technical solutions may be embodied by a software product, and the computer software product is stored in a storage medium, including a plurality of instructions used to enable computer equipment (which may be a personal computer, a server, network equipment and the like) to execute all or part of the processes in each embodiment of the present disclosure. The abovementioned storage medium includes various media capable of storing program codes such as a U disk, a mobile hard disk, a ROM, a RAM, a magnetic disk or an optical disk.

The above is only the specific implementation modes of the present disclosure and not intended to limit the scope of protection of the present disclosure. Any variations or replacements apparent to those skilled in the art within the technical scope of the present disclosure shall fall within the scope of protection of the present disclosure. Therefore, the scope of protection of the present disclosure shall be subject to the scope of protection of the claims.

The invention claimed is:

1. A method for Machine Type Communication (MTC), applied to a base station, the method comprising:
    receiving, by the base station, a terminal identity and business registration information from a terminal, the business registration information comprising a business type and service subscription information;
    allocating, by the base station, time-frequency reporting resource information to the terminal according to the business registration information;
    allocating, by the base station, an identifier which is unique to the terminal, a length of the identifier being smaller than a preset threshold;
    allocating, by the base station, a local short address to the terminal;

establishing, by the base station, a corresponding relationship between the identifier and the local short address;

sending, by the base station, the identifier to the terminal and sending, by the base station, the local short address to network equipment;

sending, by the base station, the time-frequency reporting resource information to the terminal;

receiving, by the base station, an uplink data packet from the terminal according to the time-frequency reporting resource information, the uplink data packet comprising the identifier of the terminal, replacing, by the base station, the identifier with the local short address, and forwarding, by the base station, a replaced uplink data packet to the network equipment, and receiving, by the base station, a downlink data packet from the network equipment, the downlink data packet comprising the local short address, replacing, by the base station, the local short address in the downlink data packet with the identifier, and forwarding, by the base station, a replaced downlink data packet to the terminal.

2. The method according to claim 1, before sending the time-frequency reporting resource information to the terminal, the method further comprising:

establishing a wireless connection for the terminal, but not initiatively releasing the wireless connection by the base station;

receiving a termination request from the network equipment or the terminal; and releasing the wireless connection according to the termination request.

3. The method according to claim 1, wherein the time-frequency reporting resource information comprises time-frequency resource location information and a reporting period;

or, the time-frequency reporting resource information comprises a time-frequency resource sequence generation manner and a reporting period;

or, the time-frequency reporting resource information comprises time-frequency resource location information and a number of reporting times;

or, the time-frequency reporting resource information is as same as time-frequency reporting resource information allocated to another terminal by the base station.

4. The method according to claim 1, further comprising:

sending a relative time offset to the terminal to enable the terminal to perform time calibration according to the relative time offset after the terminal wakes up from sleep;

wherein the relative time offset is a System Frame Number (SFN).

5. The method according to claim 1, further comprising:

receiving battery capacity information and uplink transmitted power level information from the terminal; and determining a battery utilization condition of the terminal and calculating a received power loss of the base station according to the battery capacity information and the uplink transmitted power level information;

wherein if the battery capacity information and the uplink transmitted power level information are failed to be demodulated, instruction information is sent to the terminal, the instruction information being used to instruct the terminal to improve uplink transmitted power.

6. A method for Machine Type Communication (MTC), applied to a terminal, the method comprising:

sending, by the terminal, a terminal identity and business registration information to a base station, the business registration information comprising a business type and service subscription information of the terminal;

receiving, by the terminal, time-frequency reporting resource information allocated to the terminal by the base station according to the business registration information;

receiving, by the terminal, from the base station, an identifier which is allocated by the base station and is unique to the terminal, a length of the identifier being smaller than a preset threshold, and there being a corresponding relationship between the identifier and a local short address allocated by the base station for the terminal;

sending, by the terminal, an uplink data packet to the base station according to the time-frequency reporting resource information, the uplink data packet comprising the identifier, so that the base station replaces the identifier in the uplink data packet with the local short address according to the corresponding relationship to obtain a replaced uplink data packet and forwards the replaced uplink data packet to network equipment; and receiving, by the terminal, a replaced downlink data packet from the base station, the replaced downlink data packet comprising the identifier, and the replaced downlink data packet being obtained through receiving, by the base station, a downlink data packet comprising the local short address from the network equipment and replacing the local short address in the downlink data packet with the identifier according to the corresponding relationship.

7. The method according to claim 6, wherein the time-frequency reporting resource information comprises information of a time-frequency resource location and a reporting period; and sending the uplink data packet to the base station according to the time-frequency reporting resource information comprises: periodically sending the uplink data packet to the base station by the reporting period at the time-frequency resource location;

or, the time-frequency reporting resource information comprises a time-frequency resource sequence generation manner and a reporting period; and sending the uplink data packet to the base station according to the time-frequency reporting resource information comprises:

generating a time-frequency resource sequence according to the time-frequency resource sequence generation manner; and sending the uplink data packet to the base station by the reporting period at the time-frequency resource sequence;

or, the time-frequency reporting resource information comprises information of a time-frequency resource location and a number of reporting times; and sending the uplink data packet to the base station according to the time-frequency reporting resource information comprises: periodically sending the uplink data packet to the base station at the time-frequency resource location, wherein sending times is the number of reporting times;

or, the method further comprises: sending battery capacity information and uplink transmitted power level information of the terminal to the base station to enable the base station to determine a battery utilization condition of the terminal and calculate a received power loss of the base station according to the battery capacity information and the uplink transmitted power level information.

8. The method according to claim 6, further comprising:
entering a sleep state after the uplink data packet is sent;
monitoring a relative time offset sent by the base station after the terminal wakes up from the sleep state; and
performing time calibration according to a stored time reference and the relative time offset;
wherein the relative time offset is a System Frame Number (SFN).

9. The method according to claim 6, after sending the terminal identity and the business registration information to the base station, the method further comprising:
establishing a wireless connection with the base station;
sending alarming information and a termination request to the base station to enable the base station to release the wireless connection according to the termination request when battery power of the terminal is lower than a preset power threshold.

10. A base station, comprising: a receiver, a processor and a sender, wherein the receiver, the processor and the sender are coupled with each other through a bus system; wherein
the receiver is arranged to receive a terminal identity and business registration information from a terminal, the business registration information comprising a business type and service subscription information;
the processor is arranged to allocate time-frequency reporting resource information to the terminal according to the business registration information received by the receiver;
the processor is further arranged to: allocate an identifier which is unique to the terminal, a length of the identifier being smaller than a preset threshold; allocate a local short address to the terminal; and establish a corresponding relationship between the identifier and the local short address;
the sender is arranged to send the identifier to the terminal, and send the local short address to network equipment;
the sender is further arranged to send the time-frequency reporting resource information allocated by the processor to the terminal; and
the receiver is further arranged to receive an uplink data packet from the terminal according to the time-frequency reporting resource information;
wherein the uplink data packet comprises the identifier of the terminal, and the sender is further arranged to replace the identifier with the local short address, and forward a replaced uplink data packet to the network equipment;
wherein the receiver is further arranged to receive a downlink data packet from the network equipment, the downlink data packet comprising the local short address; and the sender is further arranged to replace the local short address in the downlink data packet with the identifier, and forward a replaced downlink data packet to the terminal.

11. The base station according to claim 10, wherein
the processor is arranged to establish a wireless connection for the terminal, wherein the base station does not initiatively release the wireless connection;
the receiver is further arranged to receive a termination request from the network equipment or the terminal; and
the processor is arranged to release the wireless connection according to the termination request received by the receiver.

12. The base station according to claim 10, wherein
the time-frequency reporting resource information comprises time-frequency resource location information and a reporting period;
or,
the time-frequency reporting resource information comprises a time-frequency resource sequence generation manner and a reporting period;
or,
the time-frequency reporting resource information comprises time-frequency resource location information and a number of reporting times;
or,
the time-frequency reporting resource information is as same as time-frequency reporting resource information allocated to another terminal by the processor.

13. The base station according to claim 10, wherein
the sender is further arranged to send a relative time offset to the terminal to enable the terminal to perform time calibration according to the relative time offset after the terminal wakes up from sleep, wherein the relative time offset is a System Frame Number (SFN).

14. The base station according to claim 10, wherein
the receiver is further arranged to receive battery capacity information and uplink transmitted power level information from the terminal; and
the processor is arranged to determine a battery utilization condition of the terminal and calculate a received power loss of the base station according to the battery capacity information and the uplink transmitted power level information;
wherein, if the battery capacity information and the uplink transmitted power level information are failed to be demodulated, the sender is further arranged to send instruction information to the terminal, the instruction information being used to instruct the terminal to improve uplink transmitted power.

15. A terminal, comprising: a sender and a receiver coupled with the sender through a bus system; wherein
the sender is arranged to send a terminal identity and business registration information to a base station, the business registration information comprising a business type and service subscription information of the terminal;
the receiver is arranged to receive time-frequency reporting resource information allocated to the terminal by the base station according to the business registration information sent by the sender;
the receiver is further configured to receive from the base station an identifier which is allocated by the base station and is unique to the terminal, a length of the identifier being smaller than a preset threshold, and there being a corresponding relationship between the identifier and a local short address allocated by the base station for the terminal; and
the sender is further arranged to send an uplink data packet to the base station according to the time-frequency reporting resource information, the uplink data packet comprising the identifier, so that the base station replaces the identifier in the uplink data packet with the local short address according to the corresponding relationship to obtain a replaced uplink data packet and forwards the replaced uplink data packet to network equipment;

wherein the receiver is further arranged to receive a replaced downlink data packet from the base station, the replaced downlink data packet comprising the identifier, and the replaced downlink data packet being obtained through receiving, by the base station, a downlink data packet comprising the local short address from the network equipment and replacing the local short address in the downlink data packet with the identifier according to the corresponding relationship.

16. The terminal according to claim 15, wherein the time-frequency reporting resource information comprises information of a time-frequency resource location and a reporting period; and the sender is specifically arranged to periodically send the uplink data packet to the base station by the reporting period at the time-frequency resource location;

or, the time-frequency reporting resource information comprises a time-frequency resource sequence generation manner and a reporting period; and the sender is specifically arranged to:

generate a time-frequency resource sequence according to the time-frequency resource sequence generation manner, and send the uplink data packet to the base station by the reporting period at the time-frequency resource sequence;

or, the time-frequency reporting resource information comprises information of a time-frequency resource location and a number of reporting times; and the sender is specifically arranged to periodically send the uplink data packet to the base station at the time-frequency resource location, wherein sending times is reporting times;

or, the sender is further arranged to send battery capacity information and uplink transmitted power level information of the terminal to the base station to enable the base station to determine a battery utilization condition of the terminal and calculate a received power loss of the base station according to the battery capacity information and the uplink transmitted power level information.

17. The terminal according to claim 15, wherein the sender is further arranged to: send battery capacity information and uplink transmitted power level information of the terminal to the base station to enable the base station to determine a battery utilization condition of the terminal and calculate a received power loss of the base station according to the battery capacity information and the uplink transmitted power level information.

18. The terminal according to claim 15, further comprising:

a processor coupled with the receiver and the sender through the bus system and arranged to enable the terminal to enter a sleep state after the uplink data packet is sent; wherein the receiver is further arranged to monitor a relative time offset sent by the base station after the terminal wakes up from the sleep state; and the processor is further arranged to perform time calibration according to a stored time reference and the relative time offset, the relative time offset being a System Frame Number (SFN):

or, a processor coupled with the receiver and the sender through the bus system and arranged to establish a wireless connection with the base station; wherein the sender is further arranged to send alarming information and a termination request to the base station to enable the base station to release the wireless connection according to the termination request when battery power of the terminal is lower than a preset power threshold.

* * * * *